United States Patent [19]

Comera et al.

[11] 4,241,318
[45] Dec. 23, 1980

[54] FAST-SWITCHING MULTI-WAVELENGTH LASER

[75] Inventors: Jean Comera, Gieres; Claude Jaussaud, Saint Martin d'Heres, both of France

[73] Assignee: Commissariat a l'Energie Atomique, Paris, France

[21] Appl. No.: 948,564

[22] Filed: Oct. 4, 1978

[30] Foreign Application Priority Data

Oct. 4, 1977 [FR] France .............................. 77 29774
Aug. 8, 1978 [FR] France .............................. 78 23373

[51] Int. Cl.³ .............................................. H01S 3/10
[52] U.S. Cl. ........................... 331/94.5 C; 331/94.5 K; 331/94.5 M
[58] Field of Search ................. 331/94.5 C, 94.5 D, 331/94.5 K, 94.5 M

[56] References Cited

U.S. PATENT DOCUMENTS

| | | | |
|---|---|---|---|
| 3,624,551 | 11/1971 | Gudmundsen et al. | 331/94.5 C |
| 3,626,322 | 12/1971 | Strouse et al. | 331/94.5 C |

Primary Examiner—William L. Sikes

[57] ABSTRACT

The laser comprises an amplifying medium placed between a first reflector and a second dispersive reflector, and a rotating wheel adapted to carry a plurality of optical deflector elements interposed between the amplifying medium and the second dispersive reflector. A light beam having a certain incidence only in respect of a predetermined wavelength which is dependent on the incidence is reflected backwards from the second dispersive reflector. The optical reflector elements are placed periodically in the path of the light beam so as to produce a sequential modification in the incidence of the light beam emerging from the amplifying medium and to give the incidence a number of different values corresponding to the desired number of wavelengths.

8 Claims, 4 Drawing Figures

FAST-SWITCHING MULTI-WAVELENGTH LASER

This invention relates to a fast-switching multi-wavelength laser and finds an application of particular interest in the measurement of atmospheric pollutants.

When carrying out absorption measurements with a laser beam (for example when measuring atmospheric pollution by absorption spectroscopy) it is useful and in some cases necessary to make provision for a reference beam which makes it possible to distinguish, in the variations in recorded signals, the portion which represents the absorption to be measured from the portion which is due to parasitic phenomena such as the humidity of the air, the proportion of carbon dioxide, dust particles and the like which are present in the air. It has therefore proved useful to make use of lasers which are capable of emitting two (or more than two) beams having different wavelengths, one beam being used for the measurement proper and the other beam being intended to constitute a reference laser.

In the particular case of measurement of pollutants in the atmosphere, these two beams should satisfy the following conditions as far as possible:
- the beam paths must coincide in space so that both beams traverse the same atmospheric zone and can be received by the same optical system;
- the beams must have a well-defined shape (or spatial energy distribution) in order that they can readily lend themselves to computation (the Gaussian distribution of the fundamental mode is the only one that can be employed);
- the beams must be emitted sequentially and in closely spaced relation (for example at intervals of 10 ms) in order to ensure that they traverse atmospheric zones having the same state with a view to eliminating effects of turbulence.

To these conditions relating to the emitted beams can be added conditions relating to the emitting laser; this latter must be of rugged construction, it must be easy to use and it must not entail the need for frequent adjustments by highly qualified personnel.

Lasers which operate at two different wavelengths are already known. This is the case in particular with the laser described in U.S. Pat. No. 3,857,109 granted on Dec. 24, 1974 in respect of "Longitudinally-pumped two-wavelength lasers".

In this system, a polarizing device divides the cavity into two arms in which are placed two diffraction gratings set at different wavelengths.

A system of this type is subject to disadvantages when applied to the measurement of atmospheric pollutants: the laser is very difficult to operate, especially in the intermediate infrared region in which there are very few suitable polarizers in existence; secondly, it calls for the use of high-gain amplifying media since the losses introduced by the polarizer are very considerable.

Other lasers which operate on two wavelengths are known, such as the laser described in the article by Haim Lotem and R. T. Lynch, entitled "Double-wavelength laser" and published in "Applied Physics Letters", volume 27, No. 6, Sept. 15, 1975, pages 344-346. In this device, a prism is placed on a part of the light beam which passes across the cavity in front of a diffraction grating. This grating therefore receives two distinct beams at different angles of incidence, thus defining two operating wavelengths.

In this case also, the disadvantages are numerous: the two beams having different wavelengths do not coincide in space; their shape is difficult to define by reason of the absence of symmetry of revolution of the system.

There is another known type of laser, however, which emits two different wavelengths in a sequential manner. A noteworthy instance of this type is the laser described in the French Certificate of Utility No. 2,054,627 filed on July 9, 1970. A rotating wheel is placed within the cavity of a helium-neon laser; this wheel is provided with plates which have parallel faces and openings and which are placed on the path of the light beam in alternate succession. The plates are oriented at Brewster's angle of incidence in order to reduce losses. Periodic interposition of the plates modifies the length of the cavity and changes the conditions of oscillation, with the result that the laser emission wavelength changes alternately from one value to another; these two values do not have a random or indeterminate character but are imperatively determined by the characteristics of the amplifying medium.

These arrangements therefore essentially constitute means for modulating the length of a laser cavity and are applicable solely to lasers which are capable of oscillating in two distinct lines according to the length provided by the cavity. While the helium-neon laser does lend itself to this technique, this does not usually hold true in the case of the other types of lasers.

The present invention is precisely intended to provide means which are not attended by the disadvantages of the above-mentioned systems of the prior art, especially insofar as they make it possible to obtain a number of beams having different wavelengths by means of any type of laser, these beams being emitted sequentially and directed along the same paths outside the laser.

The laser in accordance with the invention is essentially based on the use within the cavity of a dispersive reflector element which is known per se in conjunction with means for sequentially modifying the incidence of the light beam on said reflector. In this manner, the wavelength of the light beam which is reflected backwards by said reflector element is accordingly modified concomitantly with its incidence.

In more precise terms, this invention is directed to a fast-switching multi-wavelength laser of the type comprising an amplifying medium disposed between a first reflector and a second dispersive reflector of the type which reflects backwards a light beam having a certain incidence only in respect of a predetermined wavelength which is dependent on said incidence. The laser essentially comprises in addition a rotating wheel adapted to carry a plurality of optical deflector elements interposed between said amplifying medium and said second dispersive reflector. Said elements are placed periodically in the path of the light beam and deflect said beam in such a manner as to produce a sequential modification in the incidence of the light beam emanating from the amplifying medium and to give this incidence a number of different values corresponding to the desired number of wavelengths.

Preferably, at least one of the optical elements is a portion of a lens having an optical axis which coincides with the axis of rotation of the wheel, said portion being intended to occupy an eccentric position on the wheel. In order to obtain different angles of deflection with lenses of this type, lenses having different focal distances are advantageously employed.

In a preferential alternative embodiment, the wheel comprises a first element constituted by a portion of a lens having a certain focal distance and a second element constituted by a plate which has parallel faces and which can be considered as a lens having an infinite focal distance.

The distinctive features and advantages of the invention will in any case become more readily apparent from the following description of exemplified embodiments which are given by way of explanation and not in any limiting sense, reference being made to the accompanying drawings, in which:

FIG. 2b is a side view of the rotating wheel shown in FIG. 2a;

Although a number of different dispersive reflector systems can be employed in the laser according to the present invention, the following description relates solely by way of explanation to a reflector constituted by a diffraction grating which operates by reflection. However, the reflector could readily be replaced by equivalent systems of the type comprising prisms and mirrors, for example.

Figure 1:
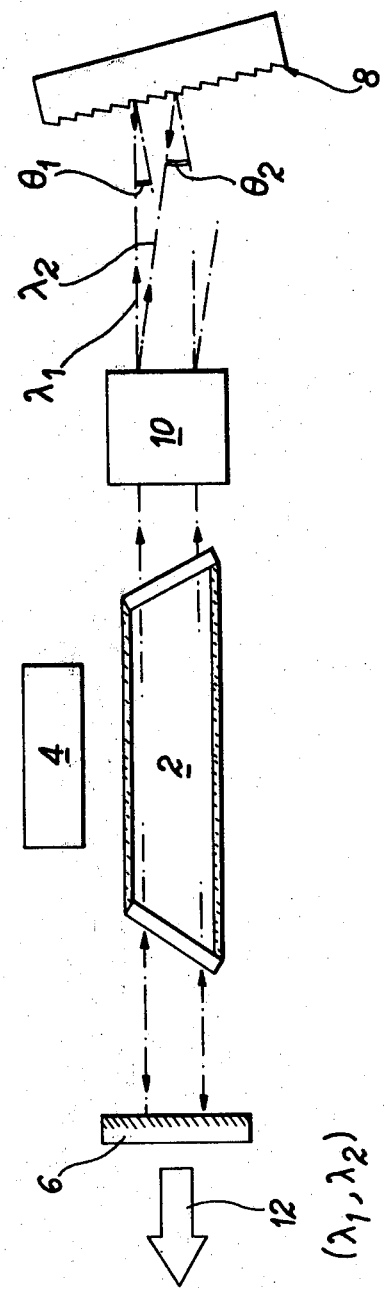
FIG. 1 is a general diagram of the laser in accordance with the invention.

The laser which is illustrated in FIG. 1 comprises an amplifying medium 2 suitably excited by means 4 which are not shown in detail; the amplifying medium is placed between a first reflector 6 and a second dispersive reflector which, in the case illustrated, is a diffraction grating 8 which operates by reflection. The device further comprises a means 10 for modifying the incidence of the light beam emerging from the amplifying medium 2 with respect to the normal to the plane of the diffraction grating 8. It is known that the light rays having an angle of incidence $\theta$ and a wavelength $\lambda$ are reflected backwards by a diffraction grating of the echelette type, for example, if the following relation is satisfied:

$$2a \sin \theta = k\lambda$$

where
a is the pitch of the grating, and
k is a whole number determined by the order employed.

In the case of two angles of incidence $\theta_1$ and $\theta_2$, there are therefore obtained two wavelengths $\lambda_1$ and $\lambda_2$ in which the light rays are reflected backwards.

In accordance with the invention, the means 10 makes it possible to modify the incidence of the light beam sequentially and for example, in the case illustrated, to produce a transition of said incidence alternately from the value $\theta_1$ to the value $\theta_2$. Under these conditions, the light beam 12 extracted from the laser for example through the mirror 6 has either the wavelength $\lambda_1$ or the wavelength $\lambda_2$.

It will be observed that the means 10 is interposed on the entire light beam emerging from the amplifying medium and not in a part of said beam as in the prior art explained earlier.

Figure 2A:
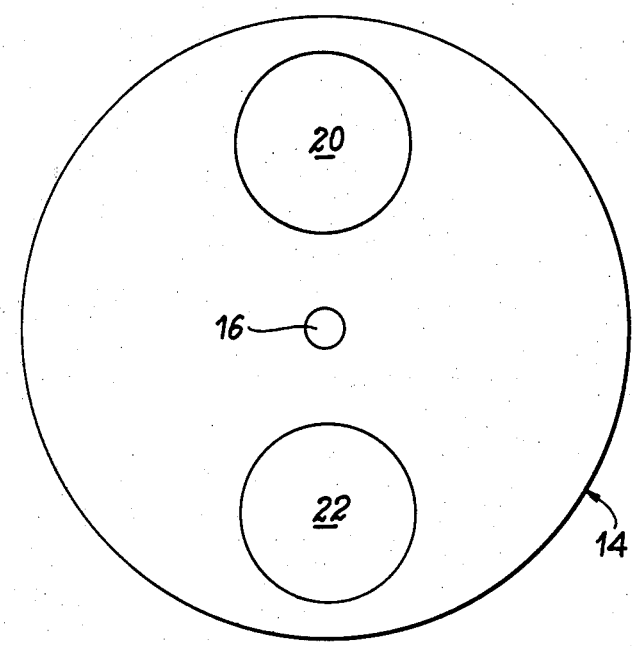
FIG. 2a is a sectional view of a rotating wheel fitted with a portion of a lens and with a plate having parallel faces.
Figure 2B:
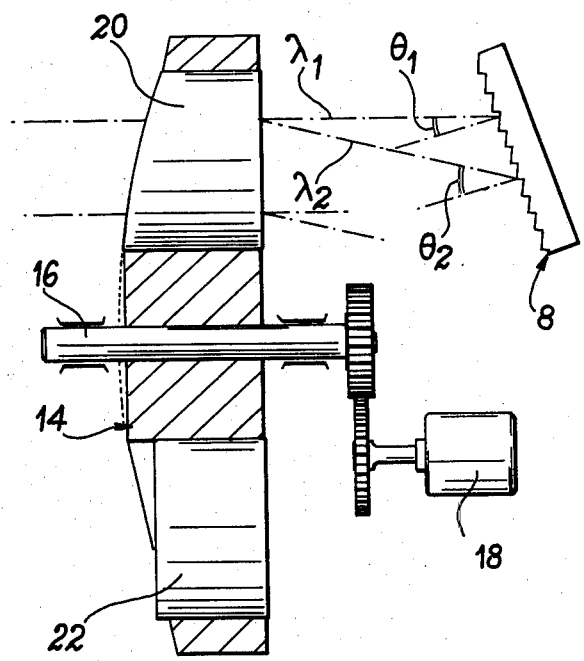

FIG. 2 shows a preferential embodiment of the means 10 for modifying the angle of incidence of the light beam. This means is constituted by a rotating wheel 14 rigidly fixed to a shaft 16 which is driven in rotation by a motor 18. Two optical elements 20 and 22 in diametrically opposite relation are mounted on said wheel. The element 20 is a portion of a lens, the optical axis of which coincides with the axis of rotation of the wheel. The second optical element 22 is constituted by a plate having parallel faces.

Said rotating wheel is mounted within the laser cavity in such a manner that the two optical elements 20 and 22 are placed alternatively in the path of the beam. This beam is therefore deflected when it passes through the lens but is no longer deflected when it passes through the plate having parallel faces. There are thus obtained downstream of the wheel two beams having different directions which will therefore impinge on the diffraction grating 8 at two different angles of incidence, which is the objective to be accomplished.

This form of construction of the means for deflecting the light beam is particularly advantageous in this application since:

it introduces small optical losses in the cavity if the faces of the optical elements are coated with non-reflecting films; but it would clearly be possible to place the wheel at the Brewster's angle of incidence;

the light beam remains Gaussian along its entire path through the cavity since a lens which works outside its axis but in the Gauss approximation converts one Gaussian beam into another Gaussian beam;

the construction of an optical device of this type is straightforward and represents no problem for anyone skilled in the art;

the angle of deflection can be slightly modified by translational displacement of the wheel at right angles to its axis; this adjustment makes it possible to broaden the dimensional tolerances allowed in the manufacture of the lens;

the number and the value of the selected wavelengths can be modified simply by exchanging wheels;

by increasing the number of lenses having different focal distances, a corresponding number of different wavelengths can be emitted;

by increasing the number of pairs of lenses and plates having parallel faces placed on one and the same wheel, the frequency of switching from one wavelength to the other is increased.

It is readily apparent that the present invention is not limited to this single form of construction of the means 10 for deflecting the light beam. Other means can be devised by anyone versed in the art. However, although exceptions are possible, they do not appear to be as advantageous as the means just described. Thus it would be possible to contemplate the use of a prism which would be introduced in an alternate movement of translation in front of the diffraction grating; but this system would not permit of fast switching (a few Hertz at a maximum) and would also introduce vibrations which would interfere with the operation of the laser.

Consideration could also be given to the use of a prism mounted on a rotating wheel. However, the angle of incidence of the beam with respect to the diffraction grating would vary during rotation of the wheel since the incident and reflected beams are in a plane at right angles to the edge of the prism and the deflected beam would accordingly describe a portion of cone, the axis of which would be the axis of the wheel. The laser would therefore be correctly aligned only in respect of a particular position of the prism, that is to say during a very short period of time. Moreover, the shape of the beam would vary during operation.

Finally, it would be possible to contemplate the use of a portion of a cone mounted on a wheel. The system would then have symmetry of revolution and the operating characteristics of the laser would not be modified during rotation of the wheel. However, this system would have a disadvantage in that it would result in an unsuitable and especially non Gaussian shape of beam. Furthermore, difficulties would be encountered in the construction of the system at the time of cutting of the part having the shape of a cone frustum.

In the laser described in the foregoing, the light beam which corresponds to the order of diffraction 0 of the grating is lost since only the beam corresponding to the order 1 is utilized. This is in any case one of the normal modes of operation of lasers of this type. It entails the need for a first reflecting element of the cavity consisting of a semi-transparent mirror in order to ensure that a fraction of the light radiation can pass through this mirror and constitute the exit beam of the laser.

It would naturally be possible to proceed otherwise and to employ the beam which undergoes specular reflection from the grating (that is to say the beam which corresponds to the 0 diffraction mode) in order to constitute the exit beam of the laser. This solution would have the advantage of permitting the use of a first reflector consisting of a totally reflecting mirror (subject to possible losses) which is easier to fabricate than a semi-transparent mirror; this would result in a reduction of cavity losses.

This mode of operation is in any case also known, especially in the dye lasers. However, it suffers from a major disadvantage in the application to the measurement of atmospheric pollutants which is contemplated in the present invention. It is in fact necessary in this application to ensure that the paths of the two beams having different wavelengths coincide in space so as to ensure that both beams pass through the same atmospheric zone. In point of fact, if the beam of order 0 is employed as exit beam, this latter occupies in space an angular position which is dependent on the selected wavelength, which is unacceptable. If reference is made to FIG. 2b, it can in fact be seen that an angular difference exists between the two beams of order 0 having wavelengths $\lambda_1$ and $\lambda_2$ and that this angular difference is equal to $\theta_2 - \theta_1$.

In order to restore the direction of the beam having a wavelength $\lambda_1$ to the beam having a wavelength $\lambda_2$, it would be necessary either to tilt the diffraction grating periodically through an angle $\theta_2 - \theta_1$ or to make use of a movable reflection mirror which takes up two positions in alternate sequence, said positions being angularly displaced by $\theta_2 - \theta_1$ with respect to each other; this oscillation of the diffraction grating or of the mirror must be synchronized with the speed of rotation of the rotating disc. Such means are clearly too highly complex to be really suitable for use in practice.

In accordance with a particular embodiment, the invention solves this problem without entailing the need to incorporate an additional moving part.

This result is obtained by placing a fixed reflection mirror on the path of the light beam which has undergone specular reflection from the diffraction grating (in other words on the path of the beam of order 0), with the result that said beam passes back through the rotating wheel and undergoes a further deflection which is capable of correcting the relative angular displacement between the two beams of different wavelengths.

Figure 3:
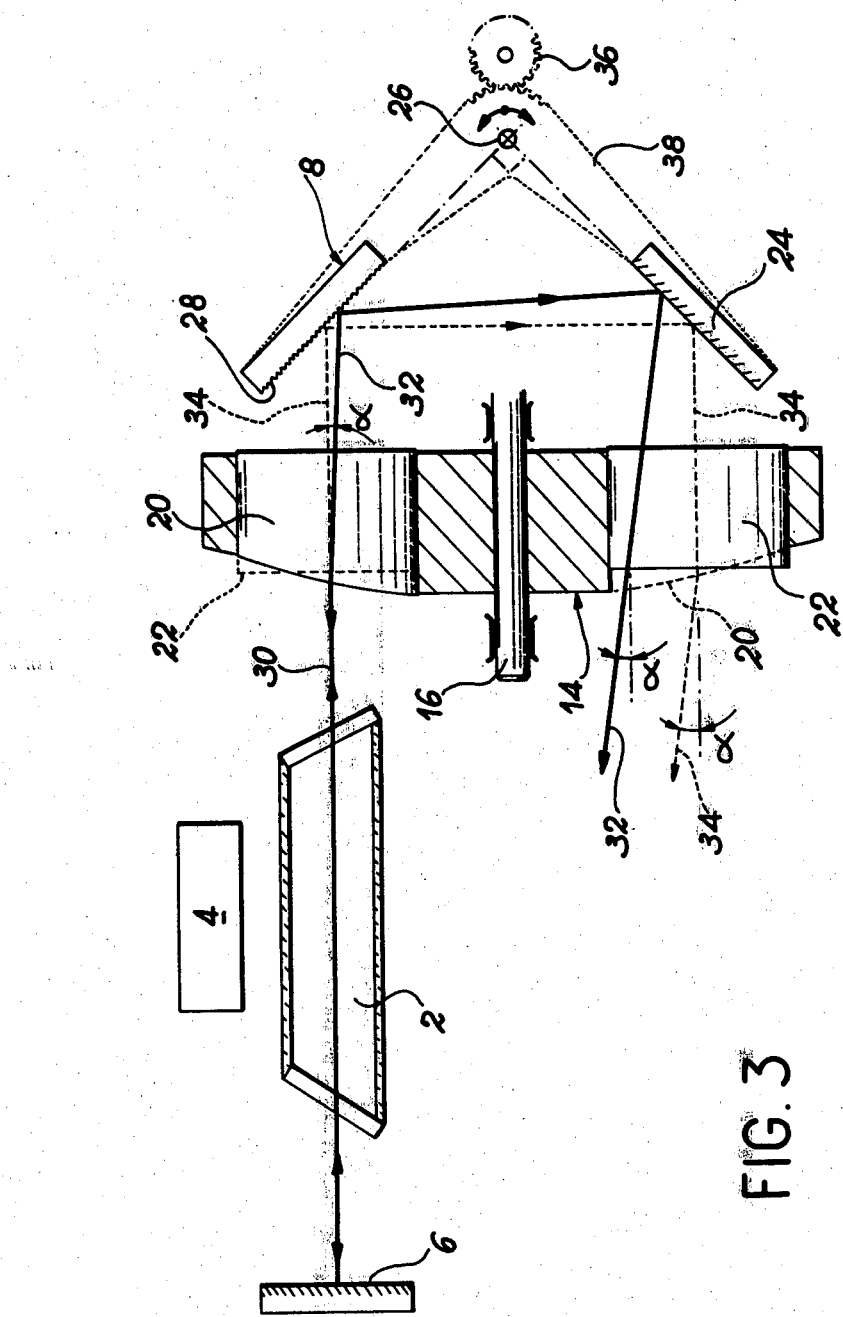
FIG. 3 is a longitudinal sectional view of an improved embodiment of the laser in accordance with the invention.

In accordance with this embodiment, the laser which is illustrated in FIG. 3 comprises an amplifying medium 2 which is suitably excited by means 4 and placed between a first reflector 6 and a second dispersive reflector 8 consisting of a diffraction grating which operates by reflection. The device further comprises a means for modifying the incidence of the light beam emerging from the amplifying medium 2 on the diffraction grating 8. This means is constituted by a rotating wheel 14 rigidly fixed to a shaft 16 which is driven in rotation by a motor (not shown in the drawings). On this wheel are mounted two optical elements 20 and 22 in diametrically opposite relation. The element 20 is a portion of a lens, the optical axis of which coincides with the axis of rotation of the wheel. The element 22 is constituted by a plate having parallel faces.

The rotating wheel is placed within the laser cavity in such a manner that the two optical elements 20 and 22 are placed on the path of the light beam 30 in alternate sequence. Said light beam is therefore deflected when it passes through the lens but is not deflected when it passes through the plate having parallel faces. There are thus obtained downstream of the wheel two beams 32 and 34 having different directions which impinge on the diffraction grating at two different angles of incidence.

The laser further comprises a reflecting mirror 24 which is perpendicular to the plane of incidence of the diffraction grating 8 and orthogonal to said grating. In other words, the plane of the mirror 24 and the plane of the grating 8 form a right dihedron, the edge 26 of which is parallel to the lines 28 of the grating. The position of the mirror 24 is such that the light beam which has undergone a specular reflection from the grating 8 followed by a reflection from the mirror 24 passes through the lower optical element of the wheel.

The operation of this device is as follows. It is known in the first place that a light beam which impinges on a right dihedron is reflected from said dihedron parallel to the direction of the incident beam, irrespective of this direction. The light beam reflected from the mirror 24 is therefore always parallel to the incident beam which strikes the grating 8. Two situations accordingly arise alternately: when the optical element located between the amplifying medium and the diffraction grating is the portion of lens 22, the light beam 32 emerges from said lens at an angle $\alpha$ with respect to its direction within the amplifying medium. The same beam 32 undergoes specular reflection from the grating followed by reflection from the mirror 24 and then reaches the optical element which is diametrically opposite to the element 22, namely the plate 20 having parallel faces in the case which is contemplated. The light beam strikes said plate at an angle of incidence $\alpha$. The direction of the beam 32 is therefore not modified as it traverses the wheel for the second time. In the final analysis, the beam 32 emerges from the laser at an angle $\alpha$ with respect to the direction of propagation in the amplifying medium.

When the optical element located between the amplifying medium and the diffraction grating is the plate 20 having parallel faces (this is the situation which arises after rotation of the wheel through one half revolution if this latter has two diametrically opposite optical elements), the light beam 34 which emerges from said plate is parallel to the direction of propagation within the amplifying medium. The beam reaches the diametrically opposite optical element 22 at a zero angle of incidence. This element, however, is now a portion of a lens and this has the effect of deflecting the incident beam through an angle equal to the angle $\alpha$. The emergent beam 34 therefore makes an angle $\alpha$ with respect to the direction of propagation within the amplifying medium and is consequently parallel to the beam 32.

Thus the two emergent rays 32 and 34 are inclined at the same angle with respect to one direction and are therefore parallel irrespective of the optical element which is present within the laser cavity.

As mentioned earlier, the use of the beam corresponding to the diffraction order 0 as an exit beam makes it possible to employ a totally reflecting mirror 6 (subject to possible losses). Resonator losses are therefor lower, thus making it possible to reduce the longitudinal dimensions of the amplifier and consequently of the apparatus.

The mirror 6 can naturally continue to be constituted by a semi-transparent mirror, in which case a second pair of beams having different wavelengths is obtained. The beams having the same wavelengths in the first pair corresponding to the diffraction order 0 and in the second pair corresponding to the order 1 are coherent. The second pair can therefore serve as a reference.

It will be observed that, in accordance with a known property of the pair consisting of diffraction grating and orthogonal mirror, the grating-mirror assembly can be rotated about the edge 26 in order to modify the pair of selected wavelengths without thereby modifying the position of the exit beam. The means for obtaining this adjustment are represented diagrammatically by a pinion 36 which is capable of driving the grating and mirror system in rotation, said grating 8 and mirror 24 being coupled together by means of a frame 38.

What we claim is:

1. A fast-switching multi-wavelength laser of the type comprising an amplifying medium associated with exciting means and disposed between a first reflector and a second dispersive reflector of the type which reflects backwards a light beam having a certain incidence only in respect of a predetermined wavelength which is dependent on said incidence, and energy abstracting means associated with said laser, wherein said laser further comprises a rotatable wheel carrying a plurality of optical deflector elements interposed between said amplifying medium and said second dispersive reflector, and means for rotating said wheel to thereby place said elements periodically in the path of the light beam, said beam being thus deflected periodically, the incidence of the light beam on the dispersive reflector being then modified in a number of different values corresponding to the desired number of wavelengths.

2. A laser according to claim 1, wherein at least one of the optical deflector elements is a portion of a lens having an optical axis which coincides with the axis of rotation of the wheel, said portion of said lens occupying an eccentric position on said wheel.

3. A laser according to claim 2, wherein said optical deflector elements are portions of lenses having different focal distances.

4. A laser according to claim 3, wherein said optical deflector elements comprise at least a first element constituted by a portion of a lens and a second element in diametrically opposite relation on said wheel, said second element being constituted by a plate having parallel faces.

5. A laser according to claim 1 wherein the second dispersive reflector is constituted by a diffraction grating which works by reflection.

6. A laser according to claim 5, wherein said laser includes a plane reflecting mirror disposed on the same side of the rotating wheel as the diffraction grating, said mirror being perpendicular to the plane of incidence on the diffraction grating and orthogonal to said grating, the grating and the mirror being so arranged that the light beam which is reflected from the reflecting mirror and has passed through one of the optical deflecting elements carried by the wheel then passes through the optical element which is diametrically opposite to the first after specular reflection from the diffraction grating and reflection from the reflecting mirror, said beam constituting the exit beam of the laser.

7. A laser according to claim 6, wherein the first reflector is semi-reflecting.

8. A laser according to claim 6, wherein the assembly consisting of reflecting mirror and diffraction grating forms a right dihedron and wherein said assembly is capable of rotational displacement about the edge of the right dihedron.

* * * * *